Figure 1:
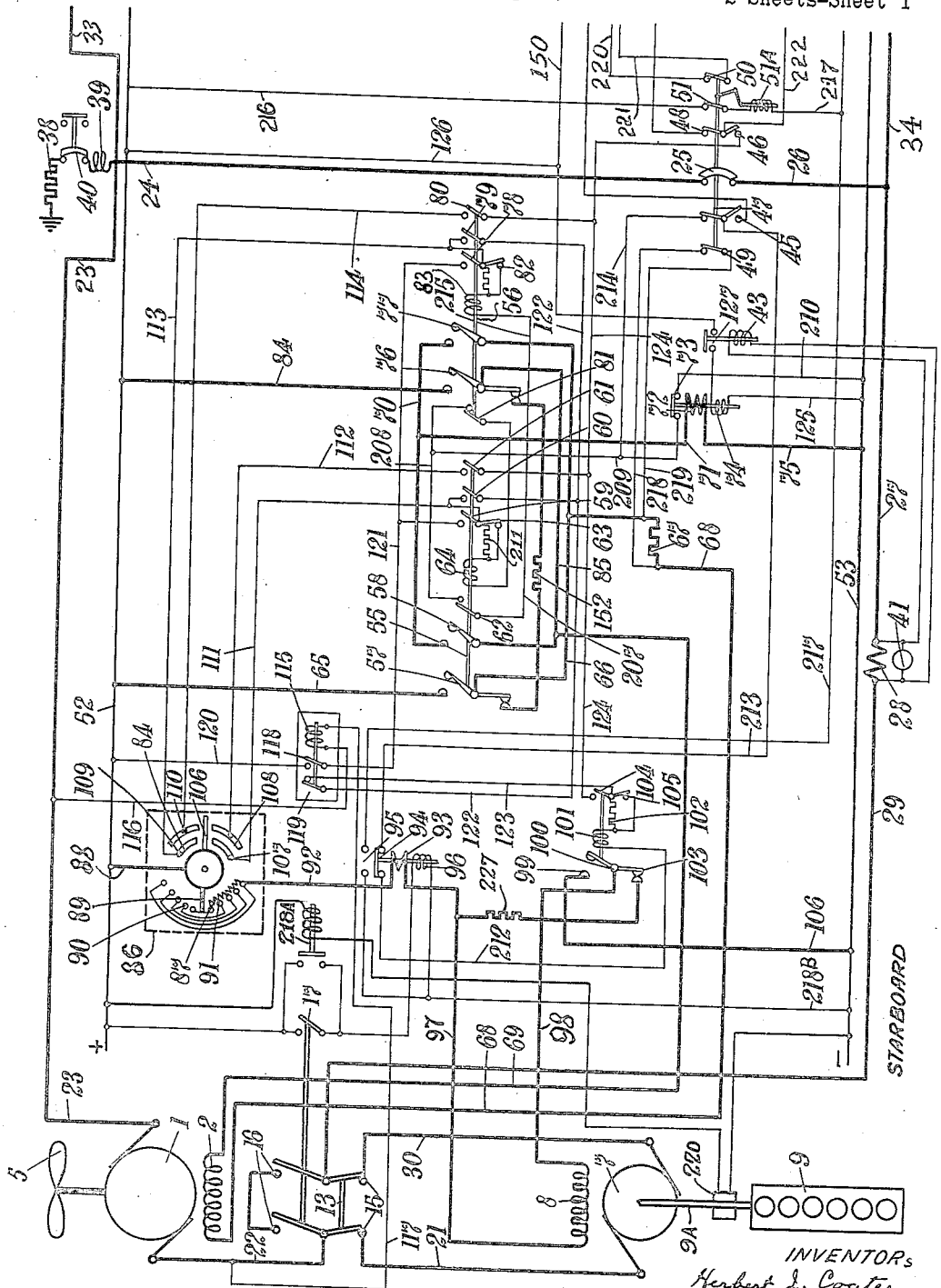

April 16, 1935.   H. J. COATES ET AL   1,997,568
ELECTRIC SHIP PROPULSION SYSTEM
Filed Aug. 4, 1934   2 Sheets-Sheet 1

INVENTORs
Herbert J. Coates
and Sydney A. G. Emms
BY
M. H. Lockwood
ATTORNEY

Patented Apr. 16, 1935

1,997,568

UNITED STATES PATENT OFFICE 1,997,568

ELECTRIC SHIP PROPULSION SYSTEM

Herbert John Coates, Erdington, Birmingham, and Sydney Albert George Emms, Leamington Spa, England, assignors to The General Electric Company Limited, London, England Application August 4, 1934, Serial No. 738,498
In Great Britain July 27, 1933

6 Claims. (Cl. 172—8)

This invention relates to electric ship propulsion systems in which normally port and starboard motors are respectively supplied with power from different generators. In such systems the danger is present that failure of the port or starboard generating plant may cause a vessel to swing sharply and foul a nearby body such as a quay and the chief object of the invention is to remove or lessen this danger.

In an electric ship propulsion system in which normally port and starboard direct current motors are respectively supplied with power from different generators, according to the present invention means are provided whereby upon failure of the port or starboard power supply port and starboard motors are automatically supplied with power from the sound power supply.

Thus in one arrangement it is arranged that upon the occurrence of a state or condition indicative of a faulty generator or prime mover in the port or starboard propulsion plant means influenced by the said state or condition effect a control whereby the sound plant supplies power to the motor or motors of the faulty plant.

Conveniently the main electrical circuits of the port and starboard power plants include a common conductor comprising a switching device the opening of which results in the port and starboard motors being connected effectively in series.

Conveniently, moreover, reverse current relays are respectively associated with the port and starboard generating plants and a relay upon operating in response to regenerated current effects operative connection of a motor of the associated plant with a generator of the other plant, this being accomplished merely by the opening of the aforementioned switching device.

Alternatively and preferably, underspeed contact devices are associated with the prime movers or generators and are adapted to effect operative connection of a motor of the associated plant with a generator of the other plant. In yet another alternative, this control may be effected by means of low voltage relays operated by magneto generators driven from the shaft of the prime mover. In addition, in an arrangement embodying either of the last two alternatives, generator field overload relays are provided which operate, upon the occurrence of a short-circuit in the generator fields, to effect the abovementioned control. Preferably, moreover, when port and starboard motors are supplied with power from the same power supply, their fields are weakened for the purpose of increasing the power taken from the power supply. Preferably also means are provided whereby, upon failure of a port or starboard generator or its prime mover, an equalization of the power available for supplying port and starboard motors is automatically effected.

Figure 2:
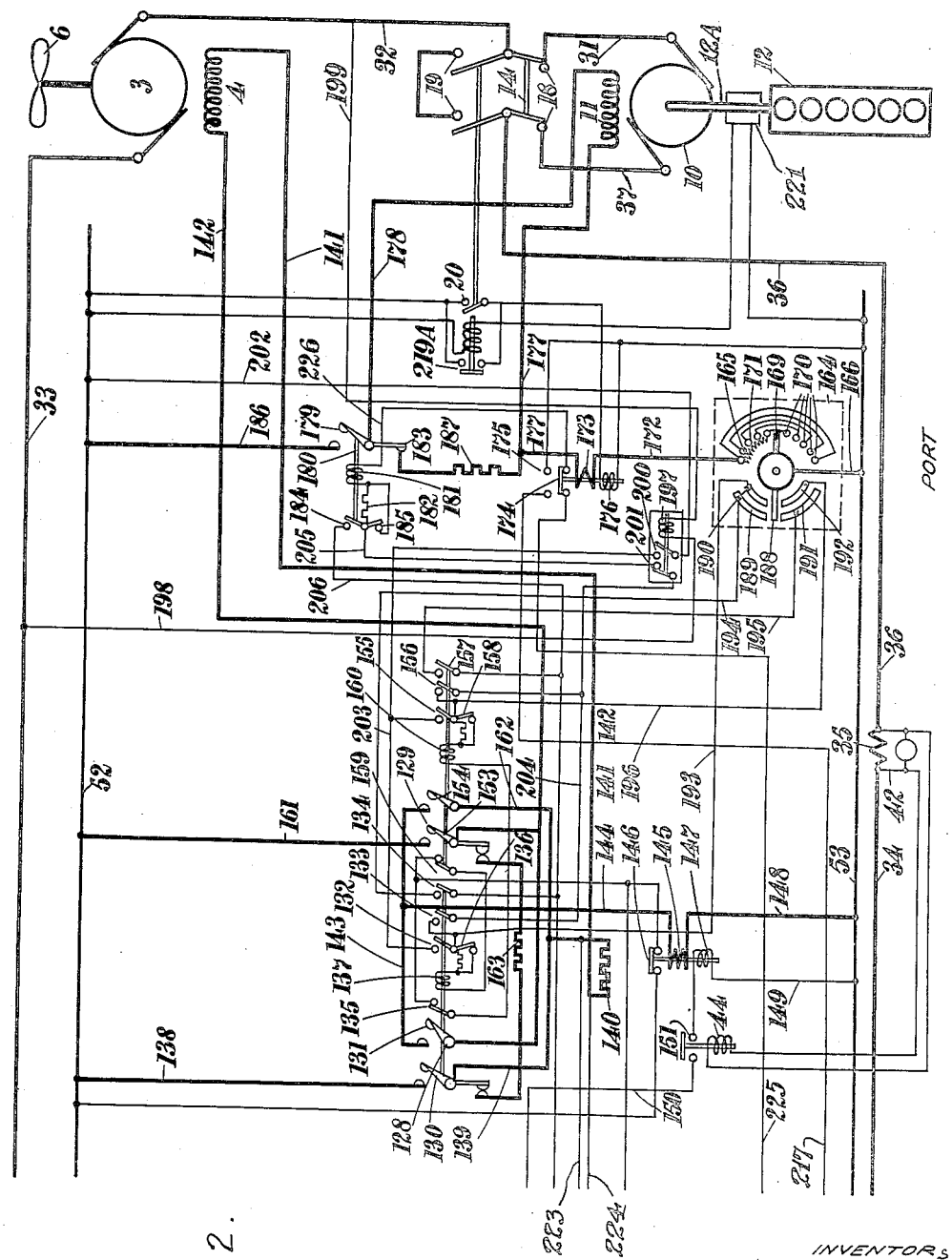

One arrangement in accordance with the invention will now be described by way of example with reference to the accompanying diagrammatic drawings, Figs. 1 and 2, in which are shown the main propulsion current and control circuits for a twin-screw Diesel-electric vessel, having two direct current generators each driven by a Diesel engine and delivering power to two direct current motors driving the screws.

In the drawings, the starboard motor driving the starboard screw 5 is provided with an armature 1 and a shunt field winding 2 while the port motor driving the port screw 6 is provided with an armature 3 and a shunt field winding 4. The starboard motor is arranged to be supplied with current from the starboard generator having an armature 7 and a separately excited shunt field 8 and driven by a Diesel engine 9. Similarly the port motor is arranged to be supplied with current from the port generator which has an armature 10, a separately excited shunt field winding 11 and is driven by a second Diesel engine 12.

Between the generators and motors of both port and starboard sides are arranged double pole changeover make before break switches 13 and 14 respectively. The starboard switch 13 makes with contacts 15 and 16, making at lower contacts 15 before opening upper contacts 16 and vice versa; in addition an auxiliary switch 17 is provided which closure of is effected on closure of the switch 13 at its upper contacts 16. The switch 17 is paralleled by underspeed contacts 218A operated by speed responsive means 220 coupled to the generator shaft 9A, upon the generator speed decreasing below a predetermined limit. Similarly the port switch 14 makes with contacts 18 and 19 making at lower contacts 18 before breaking at upper contacts 19 and vice versa; in addition an auxiliary switch 20 is provided which opens and closes with the opening and closing of the switch 14 at the upper contact 19. The switch 20 is also paralleled by underspeed contacts 219 operated by speed responsive means 221 coupled to the generator shaft 12A, upon the generator speed decreasing below a predetermined limit.

With the starboard selector switch in its lower position i. e. making at contacts 15 (which is its normal position) the generator motor circuit is completed from one side of the generator armature 7 over the line 21, left-hand contact 15 of switch 13, line 22, armature of the starboard motor line 23, common line 24, circuit breaker contacts 25 which are normally closed, common line 26, line 27, instrument shunt 28, line 29, right hand contact 15 of switch 13 and line 30, to the other side of the generator armature 7.

In a similar manner, with the port generator selector switch 14 in its normal position in which contacts 18 are made, the generator motor circuit is completed from one side of the generator armature 10 over line 31, right hand contact 18 of switch 14, line 32, motor armature 3, line 33, common line 24, circuit breaker contacts 25, line 26, line 34, instrument shunt 35, line 36, left-hand contact 18 of the switch 14 line 37 to the other side of the generator armature 10.

The conductors 24 and 26 which are common to the generator motor circuits of both port and starboard sides are adapted to carry twice the maximum current of a generator.

The common conductor 24 is earthed through a resistance 38 and the coil 39 of an earth leakage protective or alarm relay and the contacts 40 of an earth connection circuit breaker. Across the two shunts 28 and 35 are connected ammeters 41 and 42 and the coils of 43, 44 overcurrent relay devices having contacts 127 and 151 respectively.

Associated with the main contacts 25 of the contactor in the line 24 are auxiliary contacts 45, 46, which are closed when the contactor is in the "off" position and auxiliary contacts 47, 48, 49, 50 and 51 which are closed when the main contacts 25 are closed. This contactor is also provided with an operating coil 51A.

Referring now particularly to the starboard gear, the excitation current for both motor and generator fields 2 and 8 is derived from positive and negative bus-bars 52 and 53 respectively. These bus-bars, which also supply control circuit current, are energized from an auxiliary generator set, not shown.

The direction of rotation of the motor is determined by the direction of current flow through the motor field 2. Accordingly an "ahead" contactor 55 and an "astern" contactor 56 are provided. The "ahead" contactor 55 comprises normally open main contacts 57, 58, normally open auxiliary contacts 59, 60 and 61 and normally closed auxiliary contacts 62 and 63 and an operating winding 64. On closing this contactor, an "ahead" circuit is completed from positive bus-bar 52 over line 65, through contacts 57, over line 66, resistance 67, line 68, motor field 2, line 69, contacts 58, lines 70 and 71, coil 72 of a starboard motor field overload relay having normally closed contacts 73 and a further trip coil 74, and line 75 to the negative bus 53. The additional trip coil 74 is arranged to be energized over lines 125, 126 on closure of the contacts 127 which are the contacts of the overcurrent relay device having the coil 43.

Similarly the "astern" contactor 56 comprises normally open main contacts 76 and 77, normally open auxiliary contacts 78, 79 and 80 and normally closed auxiliary contacts 81 and 82 and a closing winding 83. On closing this contactor, an "astern" circuit is completed from the positive bus-bar 52 over line 84, contacts 76, line 85, line 69, motor field 2, line 68, resistance 67, line 66, contacts 77, line 70, line 71, coil 72 and line 75 to the negative bus-bar 53. The main contactors 57 and 76 are arranged when open to complete a circuit through a discharge resistance 152.

Speed control during motoring is exerted by variation of the generator field voltage, this is effected by varying the amount of resistance in series with the field 8. Accordingly in the starboard controller 86 (which will more fully be described hereinafter) there is provided a tapped resistance 87. This is arranged to be connected in a circuit from positive bus-bar 52, line 88, brush 89 contacting with studs 90 or 91 according as movement is to be "ahead" or "astern", sections of the resistance 87, line 92, coil 93 of the starboard generator field overload relay having normally closed contacts 94, normally open contacts 95 and a shunt trip coil 96, line 97, generator field 8, line 98, contacts 99 of the generator field contactor 100 (having an operating coil 101, an economy resistance 102, contacts 103 opening when the main contacts 99 close and auxiliary contacts 104 and 105) and line 106 to the negative bus-bar 53. The contacts 103 when closed complete a circuit through the discharge resistance 227.

The starboard controller 86, previously mentioned, comprises a movable element carrying brushes 89 and 106 which are both connected to the positive bus-bar 52 through the line 88. The controller conveniently externally is in the form of a normal type ship's-telegraph, and comprises a handle connected to the brush elements 89 and 106 and having a neutral "off" mid-position from which it can be moved in either direction, one direction corresponding to motion "ahead" and the other to motion "astern". The degree of movement of the handle from the mid-position in either direction determines the motoring speed, by the cutting in or out of the resistance 87 on engagement of the brush 89 with the various studs of the sets 90 and 91.

The brush 106 is the brush which is concerned with the direction setting; the brush 106 is arranged to engage tail rings 107 and 108 when in an "ahead" position and tail rings 109, 110 when in an "astern" position. The ring 107 is connected by a line 111 to one side of the auxiliary contacts 59, 60 and 63 of the "ahead" direction contactor, whilst the ring 108 is connected by a line 112 with the auxiliary contact 61 of same direction contactor. The "astern" ring 109 is connected by a line 113 with one side of the auxiliary contacts 78, 79 and 82 of the "astern" direction contactor, whilst the ring 110 is connected by a line 114 to the auxiliary contact 80.

In addition to the previously described relays, there is provided on the starboard side a low voltage interlock contactor for starboard control having a winding 115 connected by lines 116 and 117 across the motor armature 1, and normally open contacts 118 and normally closed contacts 119.

The normally open contacts 118 are arranged to be connected in a circuit extending from the positive bus-bar 52 over lines 120 and 121 to one side of contacts 59 and 78 of the "ahead" and "astern" contactors. The normally closed contacts 119 are connected in a circuit from positive bus-bar 52 and either over line 111 and contacts 60 or over line 113 and contacts 79 dependent on which direction contactor is closed, to a line 122. The other side of the contacts 119 is connected through a line 123 and normally open contacts 104 of the starboard generator field contactor to a line 124.

Referring now particularly to the port gear, the excitation current for both motor and generator fields 4 and 11 is also derived from the positive and negative bus-bars 52 and 53 respectively.

The direction of rotation of the port motor is determined by the direction of current flow through the motor field 4. Accordingly an "ahead" contactor 128 and an "astern" contactor 129 are provided. The "ahead" contactor 128 comprises normally open main contacts 130, 131, normally open auxiliary contacts 132, 133 and 134 and normally closed auxiliary contacts 135 and 136 and an operating winding 137.

On closing the "ahead" contactor 128, an "ahead" circuit is completed from positive bus-bar 52 over line 138, contacts 130 over line 139, resistance 140, line 141, motor field 4, line 142, contacts 131, lines 143 and 144, coil 145 of a starboard motor field overload relay having normally closed contacts 146 and a further trip coil 147, and line 148 to the negative bus-bar 53.

The additional trip coil 147 is arranged to be energized over lines 149, 150 and 126 on closure of the contacts 151 which are the contacts of the overcurrent relay device having the operating coil 44.

Similarly the "astern" contactor 129 comprises normally open main contacts 153 and 154, normally open auxiliary contacts 155, 156 and 157 and normally closed auxiliary contacts 158 and 159 and a closing winding 160. On closing this contactor, an "astern" circuit is completed from the positive bus-bar 52 over line 161, contacts 153, line 142, motor field 4, line 141, resistance 140, line 162, contacts 154, line 143, line 144, coil 145 and line 148 to the negative bus 53.

The main contacts 130 and 153 are arranged when open to complete a circuit through the discharge resistance 163.

Speed control during motoring is exerted by variation of the generator field voltage, this is effected by variation of the amount of resistance in series with the generator field 11. Accordingly in the port controller 164 there is provided a tapped resistance 165. This is arranged to be connected in a circuit from negative bus-bar 53, line 166, brush 169 contacting with studs 170 or 171 according as movement is to be "ahead" or "astern", sections of the resistance 165, line 172, coil 173 of the port generator field overload relay having normally closed contacts 174, normally open contacts 175 and a shunt trip coil 176, line 177, generator field 11, line 178, contacts 179 of the generator field contactor 180 (having an operating coil 181, an associated economy resistance 182, contacts 183 opening when the main contacts 180 close, which contacts 183 on closing make a circuit through a discharge resistance 187, and auxiliary contacts 184 and 185) and line 186 to the positive bus-bar 52.

The port controller 164 comprises a movable element carrying brushes 169 and 188 which are both connected to the negative bus-bar 53 through line 166. The controller, which is similar to the starboard controller 86, conveniently externally is in the form of a normal type ship telegraph and comprises a handle connected to the brush elements 169 and 188 which handle has a neutral "off" mid-position from which it can be moved in either direction, one direction corresponding to motion "ahead" and the other direction corresponding to motion "astern". The degree of movement of the handle from the mid-position, in either direction, determines the motoring speed by the cutting in or out of the resistance 165 on engagement of the brush 169 with the stud sets 170 or 171.

The brush 188 is the brush which is concerned with the direction control; the brush 188 is arranged to engage tail rings 189 and 190 when in an "ahead" position and tail rings 191 and 192 when in an "astern" position. The ring 190 is connected by a line 193 to one side of the auxiliary contacts 132, 133 and 136 of the "ahead" direction contactor 128, whilst the ring 189 is connected by a line 194 to the auxiliary contact 134 of the same direction contactor. The astern ring 191 is connected by a line 195 to the auxiliary contact 157 of the "astern" direction contactor 129 and the remaining "astern" ring 192 is connected by a line 196 to the auxiliary contacts 155, 156 and 158 of the "astern" direction contactor 129.

In addition to the previously described relays associated with the port-side gear, there is provided a low voltage interlock contactor having an exciting winding 197 connected by lines 198 and 199 across the motor armature 3, and normally open contacts 200 and normally closed contacts 201.

The normally open contacts 200 are arranged to be connected in a circuit extending from the positive bus-bar 52 over lines 202 and 203 to one side of contacts 132 and 155 of the port "ahead" and "astern" direction contactors.

The normally closed contacts 201 are connected on one side in a circuit from the negative bus-bar 53 and either over line 196 and contacts 156 or over line 193 and contacts 133 (dependent on which direction contactor is closed) to a line 204 connected to one side of the contacts 201. The other side of the contacts 201 is connected through a line 205 and normally open contacts 184 of the port generator field contactor to a line 206.

In order that a clear understanding of the invention may be attained, there will now be described the co-ordinated control and operation of the system. In the diagram the control for the Diesel engines is not shown and it is hereafter assumed that these have on starting been run up to a substantially constant speed, at which speed they are maintained.

As shown in the drawings the common connection switch 25 is in the closed position, the generator selector switches 13 and 14 are both in the "generator-in" position in which contacts are respectively made at contacts 15 and 18, the controllers are both in the stop, neutral or off position and all field contactors etc. are open.

Referring now to the starboard side, suppose the controller handle is moved to the forward position for motion ahead, the brush 106 then moves onto the tail rings 107 and 108 and connects these rings to the positive supply bus 52. A circuit is then completed from bus 52 through the ring 107, over line 111, contact 63, coil 64, line 207, interlock contact 81 of the "astern" contactor (which ensures that the "ahead" contactor cannot be closed without first opening the "astern" contactor), line 208, line 209, contacts 73 and line 210 to the negative bus-bar 53. The "ahead" contactor therefore closes and in so doing makes a maintaining circuit for itself through the economy resistance 211.

At the same time a circuit is completed from the positive bus-bar 52 through the brush 106, tail ring 107, line 111, contact 68, line 122, contacts 119 on the interlock contactor, line 123, contact 105 of the generator field contactor, coil 101 of the same contactor, line 212, contacts 94 of the generator field overload relay, line 213, contact 47 of the common connection switch 25, line 214, contacts 73 of the motor field overload contactor and line 215 to the negative bus-bar 53. Accordingly the generator field contactor 100 closes its contacts 99, making a retaining circuit for itself through an economy resistance 102.

The generator field is then energized and the generator voltage accordingly begins to build up and the motor commences to run up ahead.

At a predetermined setting of the generator voltage, the interlock contactor opens its contacts 119 and closes its contacts 118. The closing of the contacts 118 causes the "ahead" contacts to be retained closed directly from the positive bus 52 over the line 120 and line 121. On the other hand, the opening of the contacts 119 interrupts one of the retaining circuits for the generator field contactor 100, which, however, is still retained over a second retaining circuit from bus-bar 52, brush 106, tail ring 108, line 112, contact 61, line 124 and the remaining part of the similar circuit detailed above.

The speed control of the motor is then exerted by moving the controller to the various "ahead" operative positions, the speed being controlled by control of the generator excitation by the amount of the resistance 37 inserted in series with the generator field.

The port motor is run up to speed in an exactly similar manner.

If now the starboard controller is moved from an "ahead" position into an "astern" position, when the brush 106 disengages the tail ring 108, the maintenance circuit for the starboard generator field, previously detailed, is interrupted and the generator field is accordingly de-energized. The motor field "ahead" contactor 55 is, however, maintained closed over the circuit through the contacts 118; when, however, the voltage across armature 1 dies away as the generator voltage falls, the interlock relay opens this contact 118 and closes the contact 119. The "ahead" direction contactor accordingly opens. The "astern" contactor then closes since a circuit is completed over brush 106 at ring 109 and over line 113, coil 83, line 215, interlock contact 62 on the "ahead" contactor, lines 208, 209, contacts 73 of the motor field overload relay and line 210 to the negative bus-bar 53. The further sequence of events until the motor is up to speed is thereafter identical with that previously described for the "ahead" operation.

It will be seen that motor field reversals can only take place with a low voltage from the generator and in this manner heavy overcurrents are prevented during reversal.

If now both motors are assumed to be motoring ahead, both controllers being in the "ahead" position, it will be seen that on failure of the starboard Diesel driving the generator 7, the underspeed contacts 218A will close and by closing complete a circuit from the positive bus-bar 52 through the trip coil 96 and line 218B to the negative bus-bar 53. The contacts 94 are thereupon opened and the retaining circuit for the generator field contactor 100 is immediately opened and the generator field coil 8 deenergized. The contacts 95 are, however, closed with the result that a circuit is completed from the positive bus 52 over line 216, trip coil 51 of the common connection switch, line 217, contacts 95 and line 218B to the negative bus-bar 53.

The common connection switch 25 is then immediately tripped open and auxiliary contacts 49, 47, 48, 51 and 50 are opened whilst contacts 45 and 46 are closed.

It will be seen that the control thus excited by the underspeed contacts 218A, can also be effected if the generator switch 13 is thrown over to close the auxiliary switch 17, or if an overcurrent passes in the generator field 8 (in which case the trip coil 93 becomes effective).

The opening of the switch 95, as previously described, causes the de-energization of the field of the starboard generator, whilst the two motors will then be connected in series with the port generator over lines 37, 36, 34, 27, 29, 30, dead armature 7, lines 21, 22 motor armature 1, lines 23, 33, motor armature 3 and lines 32 and 31. The two motors will then be running in series at half voltage each from the port generator.

The starboard generator can now be removed from the system by throwing over the switch 13 which being of the make-before-break pattern, first short-circuits the dead armature 7 of the starboard generator, and then finally opens this armature circuit, leaving the motor circuits made through the upper contacts 16 of the switch 13.

As previously mentioned on opening the switch 25 the auxiliary contacts 49 and 50 are opened, so that the short circuit which these normally exert over lines 218, 219, 223 and 224 on the resistances 67 and 140 respectively, is removed. Since these resistances are normally connected in the motor field circuits, the insertion thereof in the shunt motor fields which have only half normal armature voltage are enabled to take up a speed which will absorb the full output of the port generator remaining in circuit.

Moreover the contacts 47 and 48 associated with the common connection switch 25 are opened and the contacts 45 and 46 associated with the same switch are closed. The circuit for the port generator field contactor 189 is then completed from the positive bus bar 52 through the brush 106 and ring 108 of the starboard controller, over line 112, contacts 61, line 124, contacts 46, line 225, contacts 174 of the port side overcurrent relay, line 226, coil 181, line 205, contact 201, line 204, contacts 133 of port "ahead" contactor, line 193, tail ring 199, brush 188, line 166 to the negative bus-bar 53.

Thus movement of either starboard or port controller to or through the stop, neutral or off position is now effective to open the port side generator field contactor so that either motor may still be reversed independently of the other, but only when the generator voltage has been brought to a low value. Control of speed, however, for both motors then depends on the position of the port controller only.

It must be appreciated that if alternatively the port generator fails, both motors are then fed from the starboard generator.

Alternative to the control effected on failure of one generator, suppose now that both engines are in use and both motors are running, the common connection switch 25 being closed, and that the starboard side motor develops an internal short circuit. A heavy current then flows in the starboard side of the system (any excess of this beyond the normal current of the port side flows via the common connection) and this heavy current on the starboard side operates the overcurrent relay 127 which closes its contacts. The closing of these contacts causes the energization of the trip coil 74 of the starboard motor field overload contactor 73 which then opens its contacts 73.

The opening of these contacts causes the de-energization of both the coil of the starboard motor field contactor and the coil of the starboard generator field contactor so that both starboard motor and generator are put out of commission. The port side is still left in operation however. In an alternative arrangement the overcurrent relay of each side may be caused to shut down both sides of the vessel upon the one motor field failing.

Generally, the tripping of the common connection switch and the generator field contactor for a failing engine condition, which is one feature of this invention, can also be applied if the system is one which permits the two motors to be run relatively "ahead" and "astern" only if two engines are in use, but which entails the same direction of rotation for both motors if only one engine is in use.

In such an arrangement, the low voltage interlock would be discarded and the reversal would be effected by reversal of the generator field only and control would be effected solely, by the controller associated with the sound engine remaining in operation. With this arrangement, in the very remote possibility of the starboard engine failing at the period when the port motor was running "ahead" from the port generator and starboard motor was running "astern" from the starboard generator, the result of opening the starboard field contactor and the common connection switch, would be that the starboard motor would first come to a stop and then run up again in the "ahead" direction leaving all control on the port controller and the vessel would automatically revert to single screw effect in operation although of course both screws would be in operation.

Generally, when the port and starboard power plants each include more than one motor or generator and one or more motors are arranged to be connected in series, upon a machine being rendered inoperative, other machines remaining in operation, adjustment means provided for controlling the motor or motors remaining in operation may automatically be effected in order to regulate the speed and/or output of the motors to a suitable or efficient value. Thus if there are two port motors and generators one generator fails the field strength of the motors associated with the remaining generator is automatically weakened, whilst if one motor fails the fields of the associated generators are weakened.

It will be seen that a feature of the invention consists in the provision of means whereby upon failure of a port or starboard generator or its prime mover an equalization of the power available for supplying port and starboard motors is automatically effected. Thus when there are a plurality of port generators and a plurality of port motors, and, for example, a port generator fails, according to a modification the means responsive to such failure automatically renders inoperative a sound starboard generator, whereby the powers driving the two sides of the ship are equalized.

We claim:—

1. An electrical ship propulsion system comprising a direct current port propulsion motor, a direct current starboard propulsion motor, generating means for the respective motors including a direct current generator and a prime mover for driving the generator, electrical circuits and connections for operatively associating the propulsion motors with the same or different generators, means responsive to abnormal currents and voltages in said generator-motor circuits resulting from faulty operation of a generator, and switching means in said circuits arranged to be operated by said responsive means to cut out the faulty generator and connect its motor with the other generator whereby both motors are operated from a single generator.

2. An electrical ship propulsion system comprising a direct current port propulsion motor, a direct current starboard propulsion motor, generating means for the respective motors including a direct current generator and a prime mover for driving the generator, electrical circuits and connections for operatively associating the propulsion motors with the same or different generators, means responsive to abnormal currents and means responsive to abnormal voltages in said generator-motor circuits resulting from faulty operation of a generator and switching means in said circuits arranged to be operated by said responsive means to cut out the faulty generator and connect its motor with the other generator so that both motors operate from a single generator.

3. An electrical ship propulsion system comprising a direct current port propulsion motor, a direct current starboard propulsion motor, generating means for the respective motors including a direct current generator and a prime mover for driving the generator, electrical circuits and connections including switching means arranged operatively to associate the propulsion motors with the same or different generators and reverse current relay means adapted, upon failure of a generator connected and operatively associated with one of the motors, to effect operation of said switching means so as to associate both motors with the other generator.

4. An electrical ship propulsion system comprising a direct current port propulsion motor, a direct current starboard propulsion motor, generating means for the respective motors including a direct current generator and a prime mover for driving the generator, electrical circuits and connections including switching means arranged operatively to associate the propulsion motors with the same or different generators and underspeed contact means adapted, upon failure of a generator connected and operatively associated with one of the motors, to effect operation of said switching means so as to associate both motors with the other generator.

5. In combination in an electrical ship propulsion system as in claim 4, overload relay devices connected in the field circuits of said generators and arranged to effect operation of said switching means to connect the two motors to a single generator.

6. An electrical ship propulsion system comprising a direct current port propulsion motor, a direct current starboard propulsion motor, generating means for the respective motors including a direct current generator and a prime mover for driving the generator, electrical circuits and connections for operatively associating the propulsion motors with the same or different generators, means responsive to abnormal currents and voltages in said generator-motor circuits resulting from faulty operation of a generator, switching means in said circuits arranged to be operated by said responsive means to cut out the faulty generator and connect its motor with the other generator and means brought into action by said switching means for inserting resistance in the field circuits of the motors to weaken the fields thereof while operating from a single generator, whereby the effective power of said generator is increased.

HERBERT JOHN COATES.
SYDNEY ALBERT GEORGE EMMS.